(12) United States Patent
Kozuka (10) Patent No.: US 11,239,478 B2
(45) Date of Patent: Feb. 1, 2022

(54) FUEL CELL SYSTEM AND PURGE METHOD THEREFOR

(71) Applicant: TOYOTA JIDOSHA KABUSHIKI KAISHA, Toyota (JP)

(72) Inventor: Tomoyuki Kozuka, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/073,941

(22) Filed: Oct. 19, 2020

(65) Prior Publication Data

US 2021/0194022 A1  Jun. 24, 2021

(30) Foreign Application Priority Data

Dec. 19, 2019 (JP) .............................. JP2019-229489

(51) Int. Cl.
*H01M 8/04119* (2016.01)
*H01M 8/04223* (2016.01)
*H01M 8/04701* (2016.01)
*H01M 8/04746* (2016.01)

(52) U.S. Cl.
CPC ... *H01M 8/04164* (2013.01); *H01M 8/04179* (2013.01); *H01M 8/04253* (2013.01); *H01M 8/04708* (2013.01); *H01M 8/04753* (2013.01)

(58) Field of Classification Search
None
See application file for complete search history.

(56) References Cited

U.S. PATENT DOCUMENTS

| 2013/0164641 | A1 | 6/2013 | Fukuda et al. | |
| 2013/0309590 | A1* | 11/2013 | Furusawa | H01M 8/04089 429/446 |
| 2014/0212780 | A1* | 7/2014 | Furusawa | H01M 8/04225 429/429 |
| 2014/0322623 | A1* | 10/2014 | Ohgami | H01M 8/04231 429/427 |

FOREIGN PATENT DOCUMENTS

| JP | 2006-331674 A | 12/2006 |
| JP | 2008-021537 A | 1/2008 |
| JP | 2013-134882 A | 7/2013 |

* cited by examiner

*Primary Examiner* — Haroon S. Sheikh
(74) *Attorney, Agent, or Firm* — Finnegan, Henderson, Farabow, Garrett & Dunner, LLP (57) ABSTRACT

A fuel cell system includes: a fuel cell including an inlet and an outlet; first and second injection devices injecting purge gas; a gas-liquid separator separating liquid water from the purge gas discharged from the outlet and causing the liquid water to flow out; a discharge valve discharging the liquid water flowing out to an outside; an ejector including: an inflow port and an outflow port for the purge gas; a first connection path between the outflow port and the inlet; an introduction path introducing the purge gas injected from the second injection device into the first connection path without flowing through the ejector; a second connection path between the gas-liquid separator and the outlet; a third connection path connected between the gas-liquid separator and the inflow port, and extending vertically upward from the gas-liquid separator; and a controller.

12 Claims, 9 Drawing Sheets

FUEL CELL SYSTEM AND PURGE METHOD THEREFOR

CROSS-REFERENCE TO RELATED APPLICATION

This application is based upon and claims the benefit of priority of the prior Japanese Patent Application No. 2019-229489, filed on Dec. 19, 2019, the entire contents of which are incorporated herein by reference.

TECHNICAL FIELD

The present disclosure relates to a fuel cell system and a purge method therefor.

BACKGROUND

In a purge process for an anode system of the fuel cell system, anode gas is injected from an injector, and then flows into the fuel cell through an ejector. After being discharged from the fuel cell, the anode gas is separated from liquid water in the gas-liquid separator, and then flows into the ejector through a circulation path from the gas-liquid separator. Accordingly, the anode gas circulates through the fuel cell (for example, see Japanese Unexamined Patent Application Publication No. 2008-21537).

Even when the anode gas flows in a direction of the above-described circulation in the purge process, moisture such as water vapor contained in the anode gas is not separated in the gas-liquid separator. Thus, the moisture is cooled in the circulation path, so that dew condensation might occur and liquid water might remain in the circulation path. For this reason, in a case where the circulation path extends vertically upward from the gas-liquid separator to the ejector, the liquid water remaining in the circulation path might drop into the gas-liquid separator and then might flow to a discharge valve through a small opening formed at a bottom of the gas-liquid separator, for example, if the fuel cell does not generate power for a long time after the purge process. If the liquid water freezes below the freezing point, the discharge valve is stuck. This might make it difficult to discharge the liquid water from the fuel cell system. Also, if the liquid water remains and freezes below the freezing point in the ejector, the circulation path, or a flow path arranged between the gas-liquid separator and the fuel cell, after the purge process, the circulation path for the anode gas is blocked. This might make it difficult to discharge the liquid water from the fuel cell system.

SUMMARY

It is therefore an object of the present disclosure to provide a fuel cell system and a purge method therefor that reduce an amount of remaining liquid water after purge.

The above object is achieved by a fuel cell system including: a fuel cell including an inlet and an outlet for purge gas; a first injection device and a second injection device that inject the purge gas; a gas-liquid separator that separates liquid water from the purge gas discharged from the outlet and causes the liquid water to flow out from an opening provided at a vertically lower side of the gas-liquid separator; a discharge valve that discharges the liquid water flowing out from the opening to an outside; an ejector including: an inflow port into which the purge gas flows from the gas-liquid separator, and an outflow port through which the purge gas injected from the first injection device flows out together with the purge gas flowing from the inflow port; a first connection path connected between the outflow port and the inlet; an introduction path that introduces the purge gas injected from the second injection device into the first connection path without flowing through the ejector, a second connection path connected between the gas-liquid separator and the outlet; a third connection path connected between the gas-liquid separator and the inflow port, and extending vertically upward from the gas-liquid separator; and a controller configured to purge the ejector, the fuel cell, and the second connection path by performing injection of the first injection device, to purge the third connection path by stopping the injection of the first injection device and by performing injection of the second injection device, and to discharge the liquid water in the gas-liquid separator by opening the discharge valve.

In the above configuration, the controller may be configured to purge the third connection path after purging the ejector.

In the above configuration, the controller may be configured to purge the third connection path after purging the ejector, the fuel cell, and the second connection path.

In the above fuel cell system may further include a temperature detector that detects an outside air temperature, wherein the controller may be configured to purge the ejector, the fuel cell, the second connection path, and the third connection path, when the outside air temperature is equal to or lower than a freezing point.

In the above configuration, the controller may be configured to purge the ejector, the fuel cell, the second connection path, and the third connection path, when the outside air temperature is higher than the freezing point, and when a temperature of the discharge valve is estimated to be equal to or lower than the freezing point.

The above fuel cell system may further include a control valve provided in the first connection path, controlling a flow rate of the purge gas flowing through the first connection path from the introduction path to the fuel cell in according with an opening degree of the control valve, wherein the controller may be configured to control the opening degree of the control valve to be smaller in purging the third connection path than in purging the ejector, the fuel cell, and the second connection path.

Also, the above object is achieved by a purge method for a fuel cell system, wherein the fuel cell system includes: a fuel cell including an inlet and an outlet for purge gas; a first injection device and a second injection device that inject the purge gas; a gas-liquid separator that separates liquid water from the purge gas discharged from the outlet and causes the liquid water to flow out from an opening provided at a vertically lower side of the gas-liquid separator; a discharge valve that discharges the liquid water flowing out from the opening to an outside; an ejector including: an inflow port into which the purge gas flows from the gas-liquid separator; and an outflow port through which the purge gas injected from the first injection device flows out together with the purge gas flowing from the inflow port; a first connection path connected between the outflow port and the inlet; an introduction path that introduces the purge gas injected from the second injection device into the first connection path without flowing through the ejector, a second connection path connected between the gas-liquid separator and the outlet; and a third connection path connected between the gas-liquid separator and the inflow port, and extending vertically upward from the gas-liquid separator, and the purge method comprises: purging the ejector, the fuel cell, and the second connection path by performing injection of the first injection device; purging the third connection path by stopping the injection of the first injection device and by performing injection of the second injection device; and discharging liquid water in the gas-liquid separator by opening the discharge valve.

In the above method, the purging the third connection path may be performed after the purging the ejector.

In the above method, the purging the third connection path may be performed after the purging the ejector, the fuel cell, and the second connection path.

In the above method, the fuel cell system may include a temperature detector that detects an outside air temperature, the purging the ejector, the fuel cell, the second connection path, and the purging the third connection path may be performed, when the outside air temperature is equal to or lower than a freezing point.

In the above method, the purging the ejector, the fuel cell, the second connection path, and the purging the third connection path may be performed, when the outside air temperature is higher than the freezing point, and when a temperature of the discharge valve is estimated to be equal to or lower than the freezing point.

In the above method, the fuel cell system may include a control valve provided in the first connection path, and controlling a flow rate of the purge gas flowing through the first connection path from the introduction path to the fuel cell in according with an opening degree of the control valve, and the method may include controlling the opening degree of the control valve to be smaller in the purging the third connection path than in the purging the ejector, the fuel cell, and the second connection path.

DETAILED DESCRIPTION (Configuration of Fuel Fell System 100)

Figure 1:
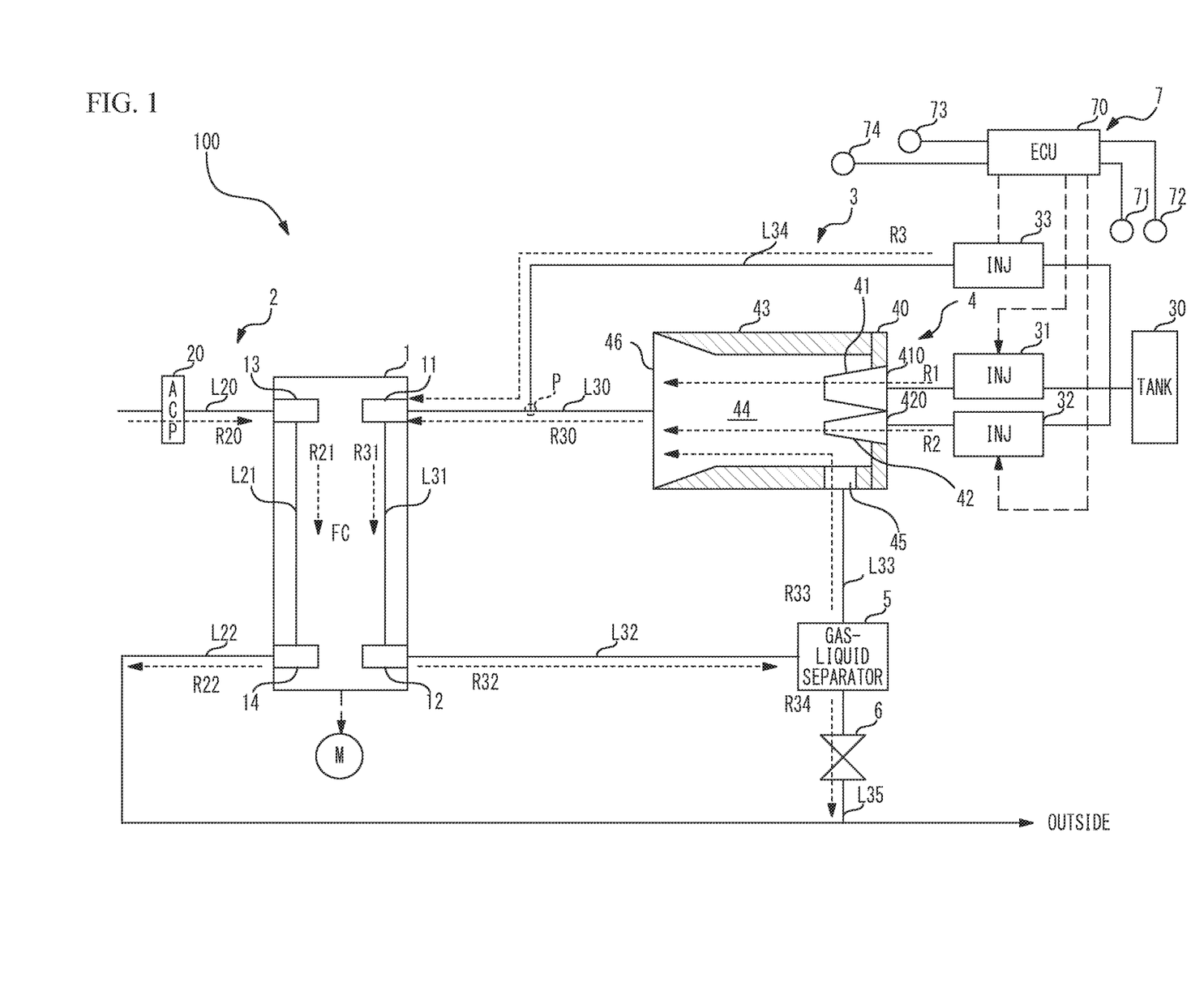
FIG. 1 is a configuration view illustrating an example of a fuel cell system.

FIG. 1 is a configuration view illustrating an example of the fuel cell system 100. The fuel cell system 100 is mounted on, for example, a fuel cell vehicle, and includes a FC (fuel cell) 1, a motor M, a cathode system 2, an anode system 3, and a control system 7. Additionally, the illustration of the electrical configuration for connecting the FC 1 and the motor M is omitted.

The FC 1 includes a stack of unit cells of a solid polymer electrolyte type. The FC 1 receives the supply of cathode gas and anode gas to generate power in response to a chemical reaction between the cathode gas and the anode gas. In the present embodiment, air containing oxygen is used as the cathode gas, and hydrogen gas is used as the anode gas. The anode gas is an example of a purge gas used for the purge process of the anode system. The power generated by the FC 1 is supplied to the motor M.

The FC 1 includes an inlet 11 and an outlet 12 for the anode gas, and an inlet 13 and an outlet 14 for the cathode gas. The inlet 11 and the outlet 12 for the anode gas are connected via an anode gas flow path L31. The inlet 13 and the outlet 14 for the cathode gas are connected via a cathode gas flow path L21. The anode gas flow path L31 and the cathode gas flow path L21 include manifolds penetrating through the stack of the unit cells, grooves formed in separators of the unit cells, and the like.

The cathode system 2 supplies air containing oxygen as the cathode gas to the FC 1. For example, the cathode system 2 includes a cathode supply pipe L20, a cathode discharge pipe L22, and an air compressor 20.

The cathode gas flows through the cathode supply pipe L20 and is supplied to the FC 1 as indicated by an arrow R20. The air compressor 20 is provided in the cathode supply pipe L20. The air compressor 20 compresses and blows the cathode gas to the inlet 13 of the FC 1. The cathode gas in the FC 1 flows through the cathode gas flow path L21 as indicated by an arrow R21. The FC 1 discharges the cathode gas, used for power generation as cathode off-gas, from the outlet 14 to the cathode discharge pipe L22. The cathode off-gas flows from the outlet 14 of the FC 1 through the cathode discharge pipe L22 and is discharged to the outside as indicated by an arrow R22.

The anode system 3 supplies the anode gas to the FC 1. The anode system 3 includes an anode supply pipe L30, an anode discharge pipe L32, a return pipe L33, a bypass pipe L34, an exhaust-drain pipe L35, a fuel tank 30, main injectors (main INJ) 31 and 32, a sub injector (sub INJ) 33, an ejector 4, a gas-liquid separator 5, and an anode discharge valve 6.

The anode gas is stored in the fuel tank 30 in a high pressure state. The fuel tank 30 supplies anode gas to the main INJs 31 and 32 and the sub INJ 33. The main INJs 31 and 32 and the sub INJ 33 inject the anode gas. The main INJs 31 and 32 are an example of a first injection device. The sub INJ 33 is an example of a second injection device.

The main INJs 31 and 32 are connected to the ejector 4. The sub INJ 33 is connected to the anode supply pipe L30 via the bypass pipe L34.

FIG. 1 illustrates a cross section of the ejector 4 along the direction in which the anode gas flows. The ejector 4 includes a fixing portion 40 having a plate shape, a large-diameter nozzle 41, a small-diameter nozzle 42, and a diffuser 43. The material of the ejector 4 includes, for example, but not limited to, Steel Use Stainless (SUS).

The fixing portion 40 fixes the large-diameter nozzle 41 and the small-diameter nozzle 42. An inlet 410 of the large-diameter nozzle 41 is connected to the main INJ 31. The inlet 420 of the small-diameter nozzle 42 is connected to the main INJ 32. The large-diameter nozzle 41 and the small-diameter nozzle 42 inject the anode gas from their injection ports from the main INJs 31 and 32, respectively. The diameter of the injection port of the large-diameter nozzle 41 is larger than that of the injection port of the small-diameter nozzle 42.

The diffuser 43 includes an ejector flow path 44 through which the anode gas flows, and an outflow port 46 connected to the anode supply pipe L30. An inflow port 45 connected to the return pipe L33 is provided on a side surface of the diffuser 43.

The anode gas injected from the main INJs 31 and 32 flows through the ejector flow path 44 to the outflow port 46 as indicated by arrows R1 and R2. The anode off-gas discharged from the FC 1 flows from the gas-liquid separator 5 through the return pipe L33, and then flows into the ejector flow path 44 through the inflow port 45. At this time, the anode gas injected from the large-diameter nozzle 41 and the small-diameter nozzle 42 serves as a driving fluid, so that the anode off-gas is sucked into the ejector flow path 44 from the inflow port 45 as indicated by an arrow R33.

The anode off-gas flowing into the ejector 4 through the inflow port 45 flows through the ejector flow path 44 together with the anode gas injected from the main INJs 31 and 32, and then flows through the outflow port 46 to the anode supply pipe L30. Thus, the anode off-gas and the anode gas flow into the FC 1 through the inlet 11 as illustrated by the arrow R30.

One end of the anode supply pipe L30 is connected to the outflow port 46 of the ejector 4. The other end of the anode supply pipe L30 is connected to the inlet 11 of the anode gas of the FC 1. One end of the bypass pipe L34 extending from the sub INJ 33 is connected to a part of the anode supply pipe L30. When at least one of the main INJs 31 and 32 injects the anode gas, the anode gas injected from the sub INJ 33 flows toward the FC 1 at a connection point P positioned between the anode discharge pipe L32 and the bypass pipe L34.

Therefore, the anode gas injected from the sub INJ 33 is introduced into the anode supply pipe L30 without flowing through the ejector 4, and then flows into the FC 1 through the inlet 11 as illustrated by an arrow R3. The anode supply pipe L30 is an example of a first connection path connected between the outflow port 46 and the inlet 11. The bypass pipe L34 is an example of an introduction pipe suppling the anode gas injected from the sub INJ 33 to the anode supply pipe L30 without flowing through the ejector 4. The anode gas flows from the inlet 11 of the FC 1 through the anode gas flow path L31 as indicated by an arrow R31, and then flows from the outlet 12 to the anode discharge pipe L32.

One end of the anode discharge pipe L32 is connected to the outlet 12 of the anode off-gas of the FC 1. The other end of the anode discharge pipe L32 is connected to the gas-liquid separator 5. The anode off-gas flows from the outlet 12 through the anode discharge pipe L32, and then flows into the gas-liquid separator 5 as indicated by an arrow R32. The anode discharge pipe L32 is an example of a second connection path connected between the gas-liquid separator 5 and the outlet 12.

The gas-liquid separator 5 separates liquid water from the anode off-gas discharged from the outlet 12, and discharges the liquid water through an opening provided at a lower side of the gas-liquid separator 5 in the vertical direction. One end of the exhaust-drain pipe L35 is connected to the gas-liquid separator 5. The other end of the exhaust-drain pipe L35 is connected to the cathode exhaust pipe L22. The exhaust-drain pipe L35 is provided with an anode discharge valve 6. When the anode discharge valve 6 opens, the liquid water and a part of the anode off-gas, flowing out of the opening of the gas-liquid separator 5, are discharged to the cathode discharge pipe L22 through the exhaust-drain pipe L35, and then are discharged to the outside together with the cathode off-gas. The anode discharge valve 6 is an example of a discharge valve that discharges liquid water flowing out of the opening to the outside.

One end of the return pipe L33 is connected to the gas-liquid separator 5. The other end of the return pipe L33 is connected to the inflow port 45 of the ejector 4. The anode off-gas flows from the gas-liquid separator 5 through the return pipe L33, and then flows through the inflow port 45 into the ejector 4. The return pipe L33 is an example of a third connection path that is connected between the gas-liquid separator 5 and the inflow port 45 and extends vertically upward from the gas-liquid separator 5.

The control system 7 includes an ECU 70, an ignition switch 71, an accelerator opening sensor 72, and temperature sensors 73 and 74. The ignition switch 71 notifies the ECU 70 of instructions to start and stop the fuel cell vehicle. The accelerator opening sensor 72 detects an opening degree of an accelerator (not illustrated) of the fuel cell vehicle and notifies the ECU 70 of the opening degree. The temperature sensor 73 detects an outside air temperature and notifies the ECU 70 thereof. The temperature sensor 74 detects a temperature of cooling water of the FC 1 and notifies the ECU 70 thereof. The temperature sensor 73 is an example of a temperature detector.

The ECU 70 includes a central processing unit (CPU), a read only memory (ROM), and a random access memory (RAM). The ECU 70 is electrically connected to the ignition switch 71, the accelerator opening sensor 72, the temperature sensors 73 and 74, the air compressor 20, the main INJs 31 and 32, the sub INJ 33, and the anode discharge valve 6.

The ECU 70 calculates a current value required for the FC 1 in accordance with the accelerator opening degree detected by the accelerator opening sensor 72. The ECU 70 gives an instruction on the flow rate of the cathode gas to the air compressor 20, and gives an instruction on the injection amount of the anode gas to at least one of the main INJs 31 and 32. When the load on the FC 1 is max, the ECU 70 may give an instruction on the injection amount to the sub INJ 33 in addition to the main INJ 31 and 32.

The ECU 70 performs the purge method for the fuel cell system 100. When detecting that the ignition switch 71 is turned off, the ECU 70 performs a purge process for the anode system 3 in accordance with the outside air temperature and the temperature of the gas-liquid separator 5. The anode gas is used as a purge gas in the purge process. The ECU 70 purges the ejector 4, the anode gas flow path L31 of the FC 1, and the anode discharge pipe L32 by performing the injection of the main INJs 31 and 32.

At this time, the anode gas flows through the paths indicated by the arrows R30 to R33. Thus, liquid water remaining in the ejector 4, the anode gas flow path L31 of the FC 1, and the anode discharge pipe L32 gathers in the gas-liquid separator 5. Further, the return pipe L33 extends vertically upward from the gas-liquid separator 5 to the ejector 4. For this reason, moisture such as water vapor not separated in the gas-liquid separator 5 might be condensed in the return pipe L33, and then liquid water might remain therein. In this case, the liquid water might drop into the gas-liquid separator 5 and might flow out of the small opening provided at the bottom of the gas-liquid separator 5 to the anode discharge valve 6, after the purge process, for example, when the FC 1 does not generate power for a long time. If the liquid water freezes below the freezing point, the anode discharge valve 6 might be stuck. This might make it difficult to discharge the liquid water from the fuel cell system 100.

Therefore, the ECU 70 purges the return pipe L33 by stopping the injection of the main INJs 31 and 32 and by performing the injection of the sub INJ 33.

Figure 2:
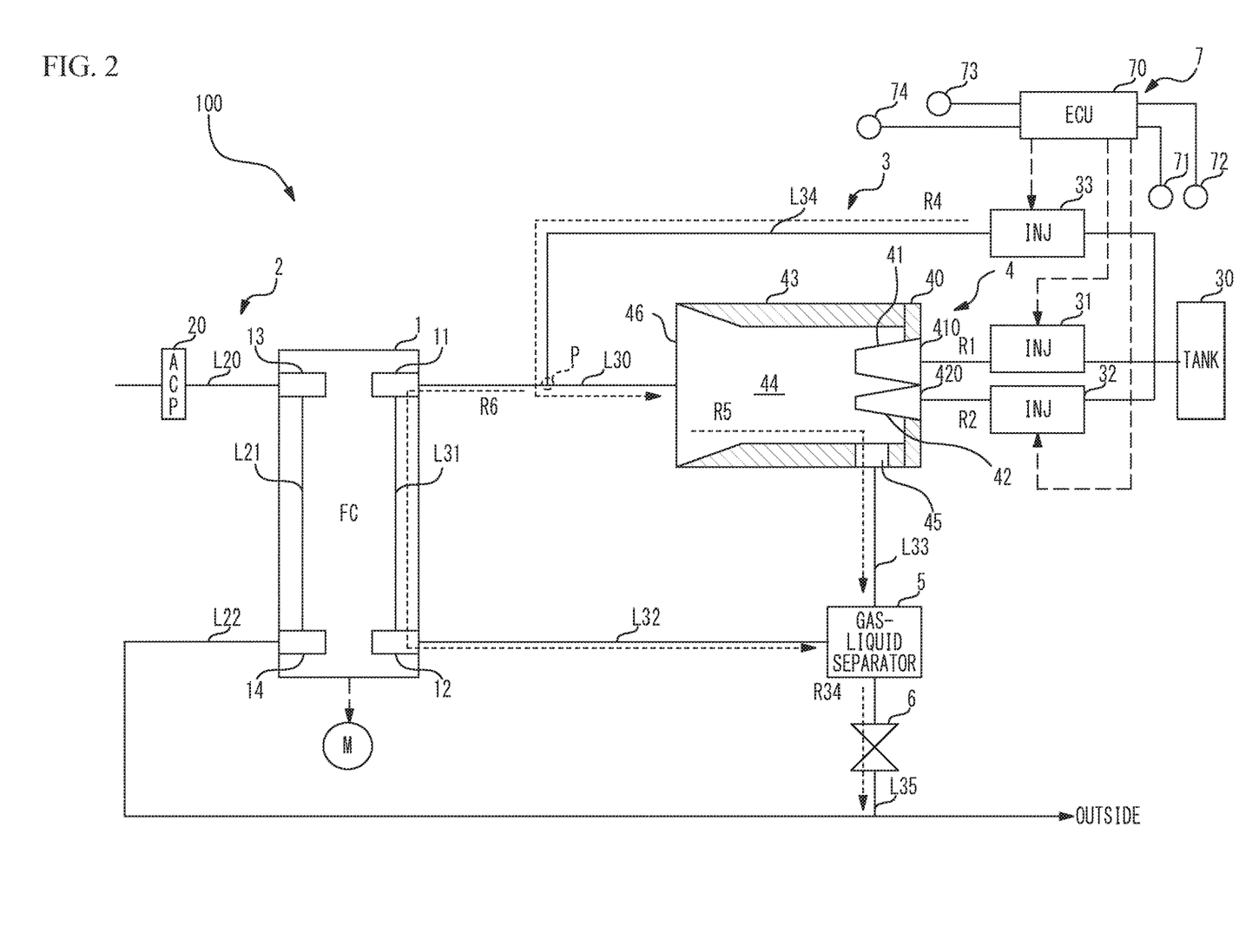
FIG. 2 is a view illustrating an example of a purge process for a return pipe.

FIG. 2 is a view illustrating an example of a purge process for purging the return pipe L33. The same reference numerals are given to the same components in FIG. 2 as those in FIG. 1, and duplicated description thereof is omitted.

Most of the anode gas injected from the sub INJ 33 flows to the ejector 4 at the connection point P. This is because there is no flow of the anode gas from the main INJs 31 and 32 and a pressure loss of the ejector 4 is lower than that of the FC 1. Therefore, most of the anode gas flows through the bypass pipe L34, and then flows backward through the anode supply pipe L30 into the ejector flow path 44 from the outflow port 46 of the ejector 4, as indicated by an arrow R4. The anode gas flows through the ejector flow path 44 into the return pipe L33 from the inflow port 45, and then flows backward through the return pipe L33 into the gas-liquid separator 5 as indicated by an arrow R5. Thus, the liquid water remaining in the return pipe L33 gathers in the gas-liquid separator 5.

The anode gas, which does not flow to the ejector 4, injected from the sub INJ 33 flows into the gas-liquid separator 5 through the anode supply pipe L30, the anode gas flow path L31, and the anode discharge pipe L32 as indicated by an arrow R6. Since a cross-sectional area of the anode gas flow path L31 is smaller than each cross-sectional area of the ejector flow path 44 and the return pipe L33, the pressure loss of the anode gas flow path L31 is so high that the anode gas does not tend to flow therethrough.

The ECU 70 controls opening and closing of the anode discharge valve 6. When the anode discharge valve 6 opens, the liquid water in the gas-liquid separator 5 flows through the exhaust-drain pipe L35, and then is discharged from the cathode discharge pipe L22 to the outside, as indicated by an arrow R34.

Figure 3:
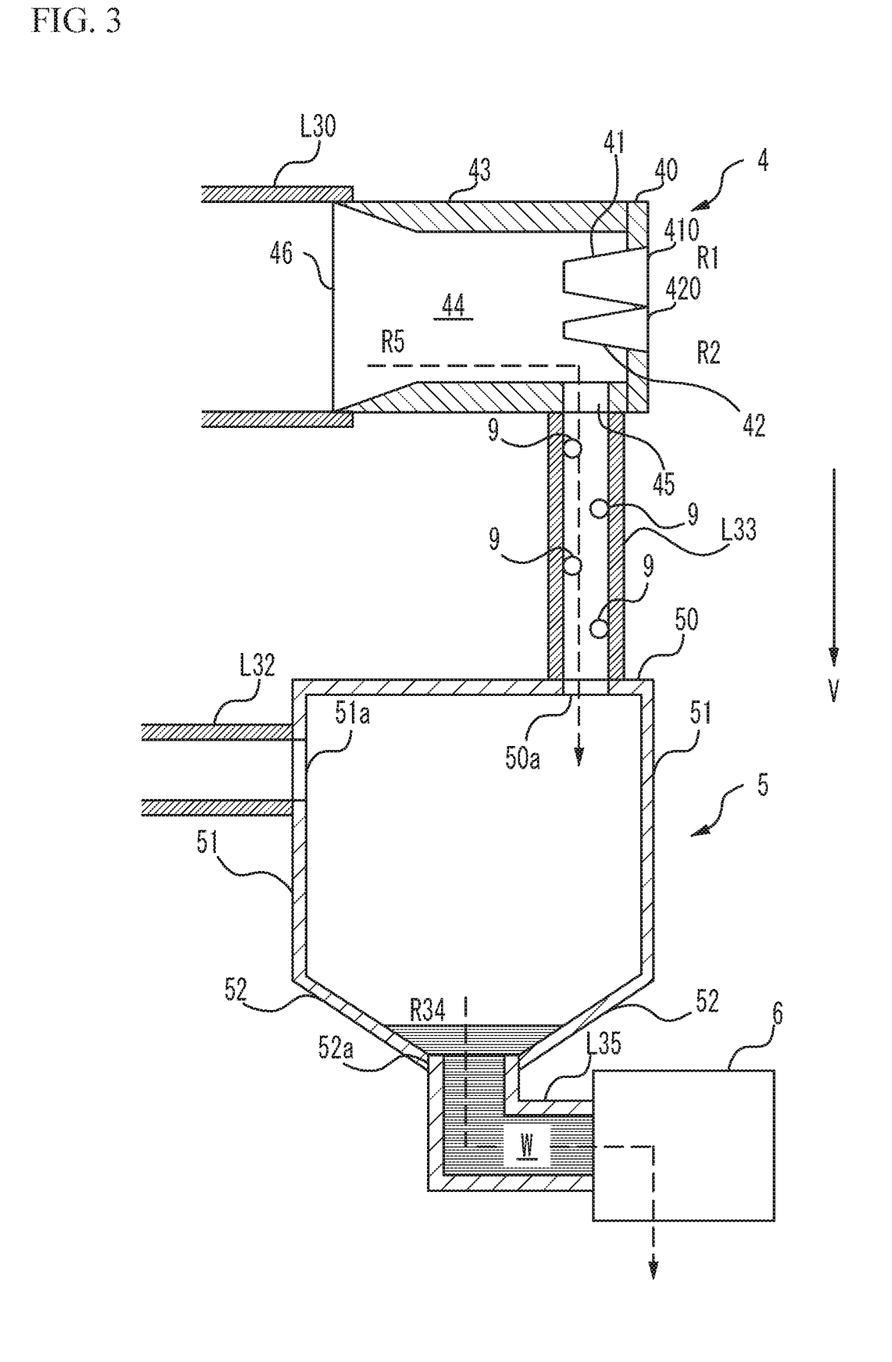
FIG. 3 is a view illustrating an example of a state in which liquid water remaining in a return pipe gathers in a gas-liquid separator.

FIG. 3 is a view illustrating an example of a state in which liquid water remaining in the return pipe L33 gathers in the gas-liquid separator 5. The same reference numerals are given to the same components in FIG. 3 as those in FIG. 1, and duplicated description thereof is omitted.

The return pipe L33 extends, for example, from the inflow port 45 of the ejector 4 in the vertical direction V, and is connected to an upper part of the gas-liquid separator 5.

The gas-liquid separator 5 includes a cylindrical portion 51, an upper surface portion 50 covering the cylindrical portion 51, and a bottom portion 52 continuously extending from a lower end of the cylindrical portion 51 and having a funnel shape. The cylindrical portion 51 is provided with aside opening 51a. The upper surface portion 50 is provided with an upper opening 50a. An edge of the side opening 51a is connected to the anode discharge pipe L32. An edge of the upper opening 50a is connected to the lower end of the return pipe L33.

Further, the bottom portion 52 is provided at its center with an opening 52a. An edge of the opening 52a is connected to the exhaust-drain pipe L35 having an L shape. The exhaust-drain pipe L35 extends from the bottom portion 52 in the vertical direction V, and then is bent at a right angle toward the anode discharge valve 6.

Moisture contained in the anode gas not separated therefrom in the gas-liquid separator 5 is condensed, and then water drops 9 are attached on an inner wall of the return pipe L33. The anode gas flows through the ejector flow path 44 from the anode supply pipe L30, and flows into the return pipe L33 from the inflow port 45, as illustrated by an arrow R5. Thus, the water drops 9 gather in the gas-liquid separator 5 from the return pipe L33.

The water drops 9 are stored as liquid water W on the bottom portion 52 of the gas-liquid separator 5. The liquid water W flows through the exhaust-drain pipe L35, and then reaches the anode discharge valve 6, as indicated by an arrow R34. When the anode discharge valve 6 opens, the liquid water W in the gas-liquid separator 5 is discharged.

(Operation of ECU 70)

Figure 4:
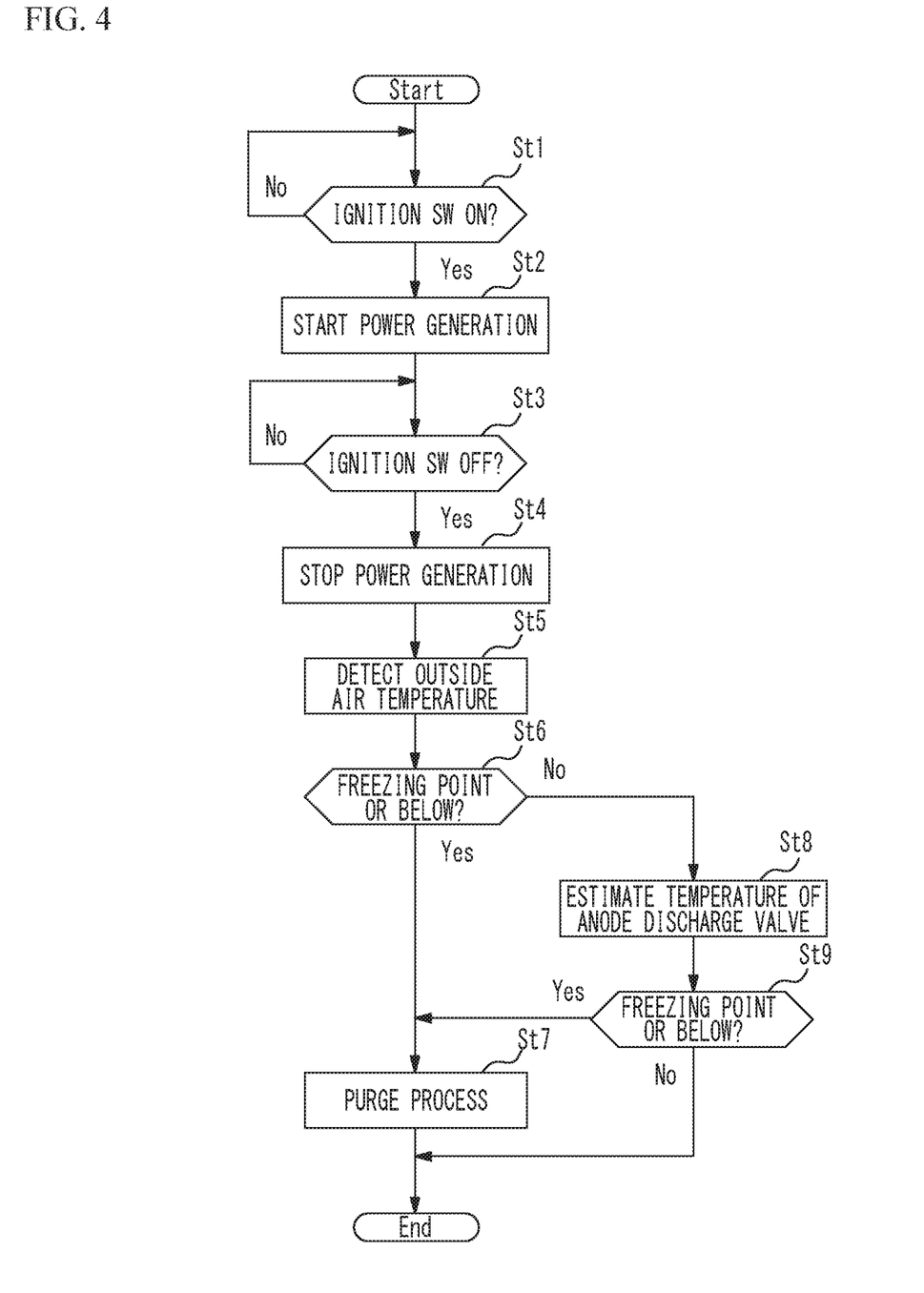
FIG. 4 is a flowchart illustrating an example of an operation of an Electronic Control Unit (ECU)

FIG. 4 is a flowchart illustrating an example of operation of the ECU 70. The ECU 70 determines whether or not the ignition switch 71 is turned on (Step St1). When the ignition switch 71 is not turned on (No in Step St1), the process in Step St1 is performed again.

When the ignition switch 71 is turned on (Yes in Step St1), the ECU 70 starts power generation by the FC 1 (Step St2). At this time, for example, the ECU 70 gives an instruction on a supplying amount of the anode gas to the main INJs 31 and 32 and the sub INJ 33, and gives an instruction on a supplying amount of the cathode gas to the air compressor 20, in accordance with the accelerator opening degree detected by the accelerator opening sensor 72.

Next, the ECU 70 determines whether or not the ignition switch 71 is turned off (Step St3). When the ignition switch 71 remains an on state (No in Step St3), the process in Step St3 is performed again.

When the ignition switch 71 is tuned off (Yes in Step St3), the ECU 70 stops the power generation of the FC 1 (Step St4). At this time, for example, the ECU 70 stops the supply of the cathode gas from the air compressor 20 and the supply of the anode gas from the main INJs 31 and 32. Next, the ECU 70 detects an outside air temperature by the temperature sensor 73 (Step St5). The ECU 70 determines whether or not the outside air temperature is equal to or lower than the freezing point (Step St6).

When the outside air temperature is equal to or lower than the freezing point (Yes in step St6), the ECU 70 performs a purge process (step St7). That is, when the outside air temperature is equal to or lower than the freezing point, the ECU 70 purges the ejector 4, the anode gas flow path L31 of the FC 1, the anode discharge pipe L32, and the return pipe L33, as described with reference to FIGS. 1 and 2. For this reason, when the outside air temperature is equal to or lower than the freezing point, the liquid water in the ejector 4, the anode gas flow path L31 of the FC 1, the anode discharge pipe L32, and the return pipe L33 gathers in the gas-liquid separator 5, and is discharged to the outside. This suppresses the liquid water from freezing on the anode discharge valve 6.

When the outside air temperature is higher than the freezing point (No in Step St6), the ECU 70 estimates a temperature of the anode discharge valve 6 (Step St8). At this time, the ECU 70 estimates the temperature of the anode discharge valve 6 on the basis of the outside air temperature detected by the temperature sensor 73, the temperature of the cooling water of the FC 1 detected by the temperature sensor 74, and the like.

When the estimated temperature is equal to or lower than the freezing point (Yes in Step St9), the ECU 70 performs the purge process (Step St7). When the estimated temperature is higher than the freezing point (No in Step St9), the purge process is not performed.

In such a manner, when the outside air temperature is higher than the freezing point, and when the temperature of the anode discharge valve 6 is estimated to be equal to or lower than the freezing point, the ECU 70 purges the ejector 4, the anode gas flow path L31 of the FC 1, the anode discharging pipe L32, and the return pipe L33. When the outside air temperature is higher than the freezing point, and when the temperature of the anode discharge valve 6 is estimated to be equal to or lower than the freezing point, the liquid water gathers in the gas-liquid separator 5 from the ejector 4, the anode gas flow path L31 of the FC 1, the anode discharging pipe L32, and the return pipe L33, and then is discharged to the outside. This suppresses the liquid water from freezing on the anode discharge valve 6.

Next, an example of the purge process in step St7 will be described.

Figure 5:
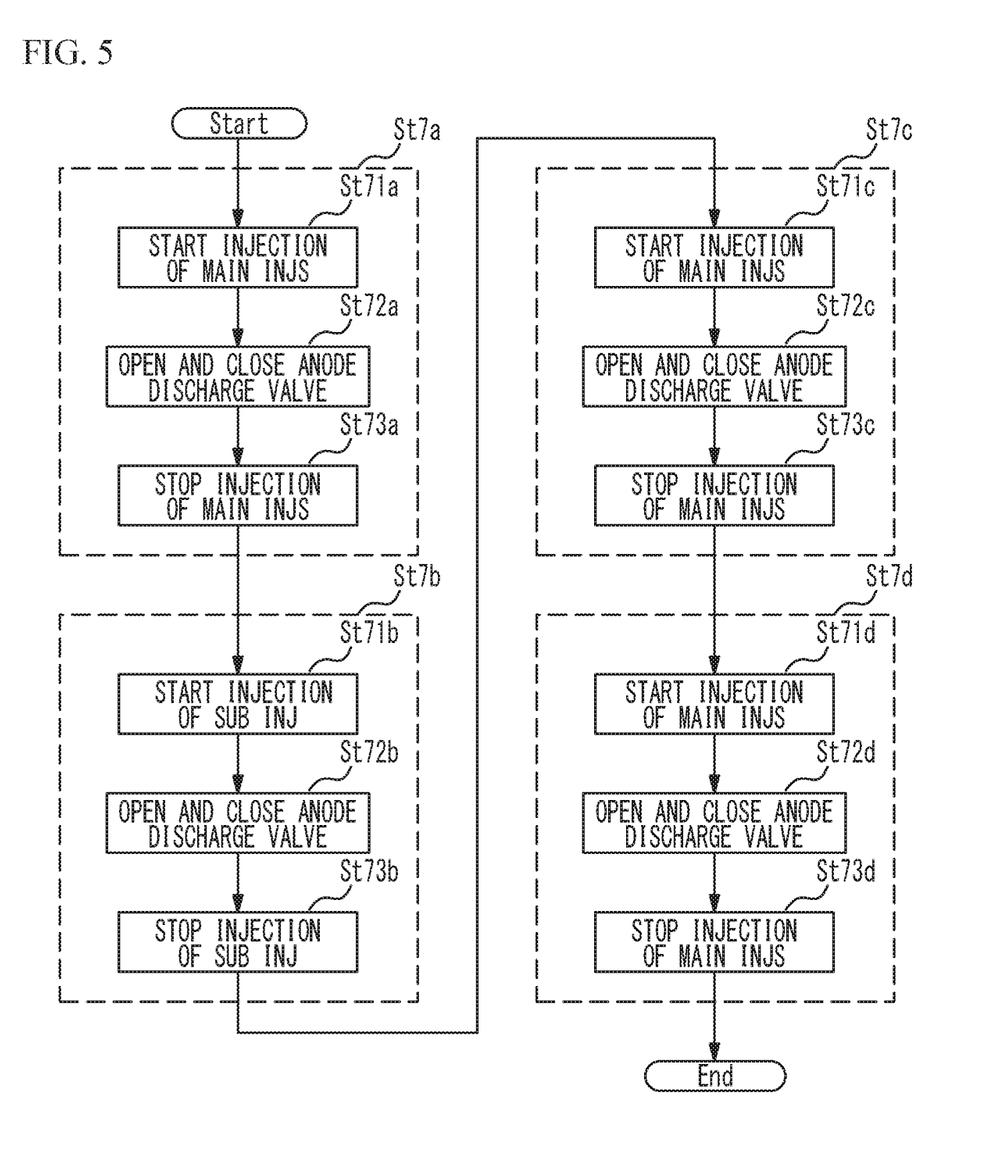
FIG. 5 is a flowchart illustrating an example of the purge process.

FIG. 5 is a flowchart illustrating an example of the purge process. The ECU 70 may control the air compressor 20 to supply the cathode gas to the cathode discharge pipe L22, in order to dilute the anode gas discharged thereto before the purge process. The purge process for the anode system 3 includes a purge process for purging the ejector 4 (Step St7a), a purge process for purging the return pipe L33 (Step St7b), a purge process for purging the FC 1 (Step St7c), and a purge process for purging the gas-liquid separator 5 (step St7d).

First, the ECU 70 performs the purge process for the ejector 4 (Step St7a). The ECU 70 starts the injection of the main INJs 31 and 32 (Step St71a). At this time, the ECU 70 controls the main INJs 31 and 32 to inject the anode gas at the same frequency. Accordingly, the liquid water having remained in the ejector 4g is collected in the gas-liquid separator 5.

Next, the ECU 70 opens and closes the anode discharge valve 6 a predetermined number of times (Step St72a). Thus, the liquid water is discharged from the gas-liquid separator 5. Next, the ECU 70 stops the injection of the main INJs 31 and 32 (Step St73a).

Second, the ECU 70 performs the purge process for the return pipe L33 (Step St7b). The ECU 70 starts the injection of the sub INJ 33 (Step St71b). At this time, the ECU 70 controls the sub INJ 33 to inject the anode gas when the injection of the main INJs 31 and 32 is stopped. Therefore, the anode gas flows backward into the return pipe L33. Accordingly, the liquid water having remained in the return pipe L33 is collected in the gas-liquid separator 5.

Next, the ECU 70 opens and closes the anode discharge valve 6 a predetermined number of times (Step St72b). Thus, the liquid water is discharged from the gas-liquid separator 5. Next, the ECU 70 stops the injection of the sub INJ 33 (Step St73b).

In the above way, the ECU 70 purges the return pipe L33 after purging the ejector 4. This facilitates the flow of the anode gas from the ejector 4 to the return pipe L33 in the purge process of the return pipe L33.

Third, the ECU 70 performs the purge process for the FC 1 (Step St7c). The ECU 70 starts the injection of the main INJs 31 and 32 (Step St71c). At this time, the ECU 70 controls the main INJs 31 and 32 to inject the anode gas at, for example, different frequencies. Accordingly, the liquid water having remained in the anode gas flow path L31 and the anode discharge pipe L32 at the downstream side thereof is collected in the gas-liquid separator 5.

Next, the ECU 70 opens and closes the anode discharge valve 6 a predetermined number of times (Step St72c). Thus, the liquid water is discharged from the gas-liquid separator 5. Next, the ECU 70 stops the injection of the main INJs 31 and 32 (Step St73c).

Next, the ECU 70 performs the purge process for the gas-liquid separator 5 (Step St7d). The ECU 70 starts the injection of the main INJs 31 and 32 (Step St71d). At this time, the ECU 70 controls the main INJs 31 and 32 to inject the anode gas at a large amount, as compared with the purge process each for the ejector 4 and the FC 1. Accordingly, the liquid water having remained in the gas-liquid separator 5 is collected at the bottom portion 52.

Next, the ECU 70 opens and closes the anode discharge valve 6 a predetermined number of times (Step St72d). Thus, the liquid water is discharged from the gas-liquid separator 5. Next, the ECU 70 stops the injection of the main INJs 31 and 32 (Step St73d).

In this way, the purge process is performed. Additionally, the purge processes for the FC 1 and the gas-liquid separator 5 (Step St7c, St7d) are performed after the purge process for the ejector 4 (Step St7b). For this reason, the ECU 70 may set a liquid water separation rate in the purge process each for the FC 1 and the gas-liquid separator 5 (Steps St7c and St7d) to be higher than in other purge process, in consideration of a decrease in the liquid water remaining in the return pipe L33.

Figure 6:
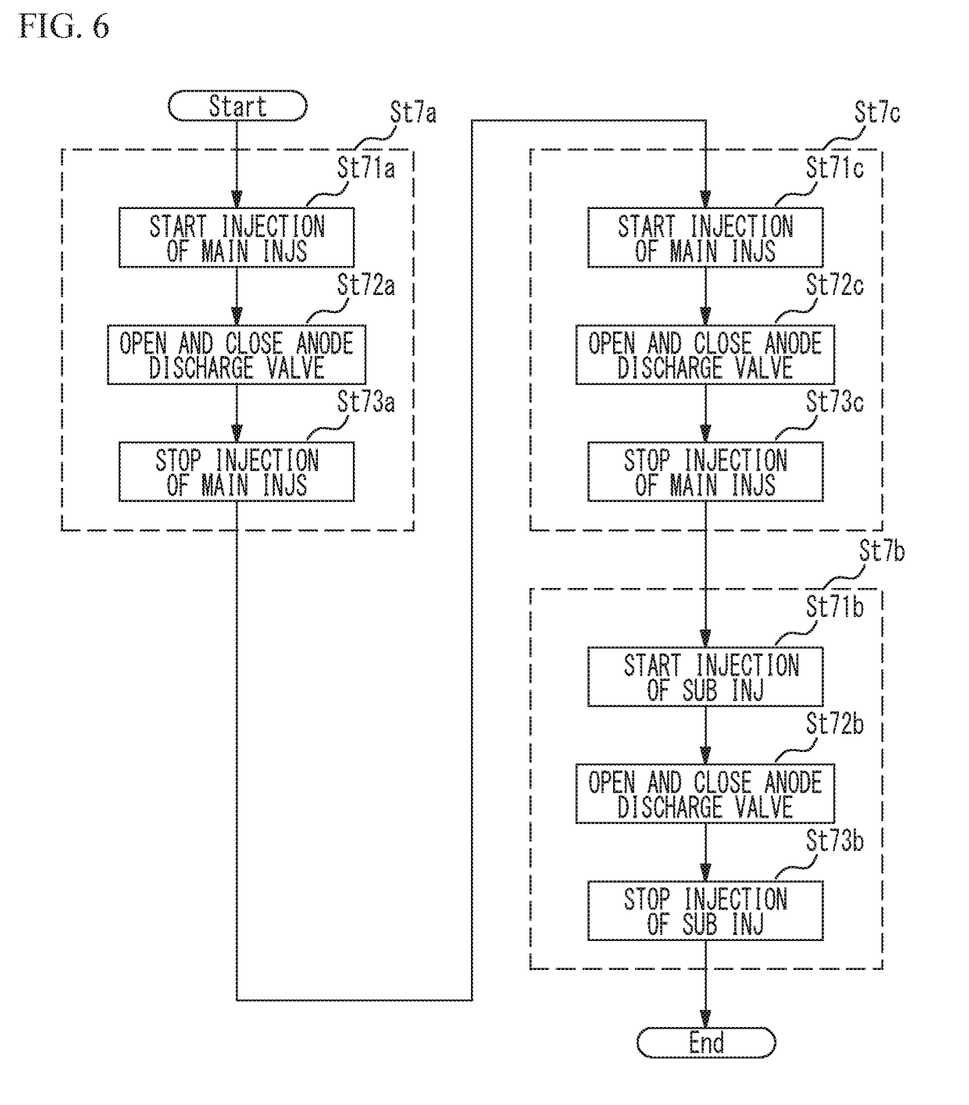
FIG. 6 is a flowchart illustrating another example of the purge process.

Also, the ECU 70 may perform the purge process for the return pipe L33 (Step St7b) last, unlike the order of the purge process described above. FIG. 6 is a flowchart illustrating another example of the purge process. In FIG. 6, the same processes as those in FIG. 5 are denoted by the same reference numerals, and duplicated description thereof is omitted.

In the present embodiment, the purge process for the return pipe L33 (Step St7b) is performed last. Thus, the gas-liquid separator 5 is purged in addition to the return pipe L33, so that the purge process for the gas-liquid separator 5 (Step St7d) in the above example is omitted.

In this manner, the ECU 70 purges the return pipe L33 after purging the ejector 4, the FC 1, and the anode discharge pipe L32. Thus, the liquid water is discharged more efficiently, and the entire purge process is shortened.

(Example of Another Fuel Cell System 100a)

Figure 7:
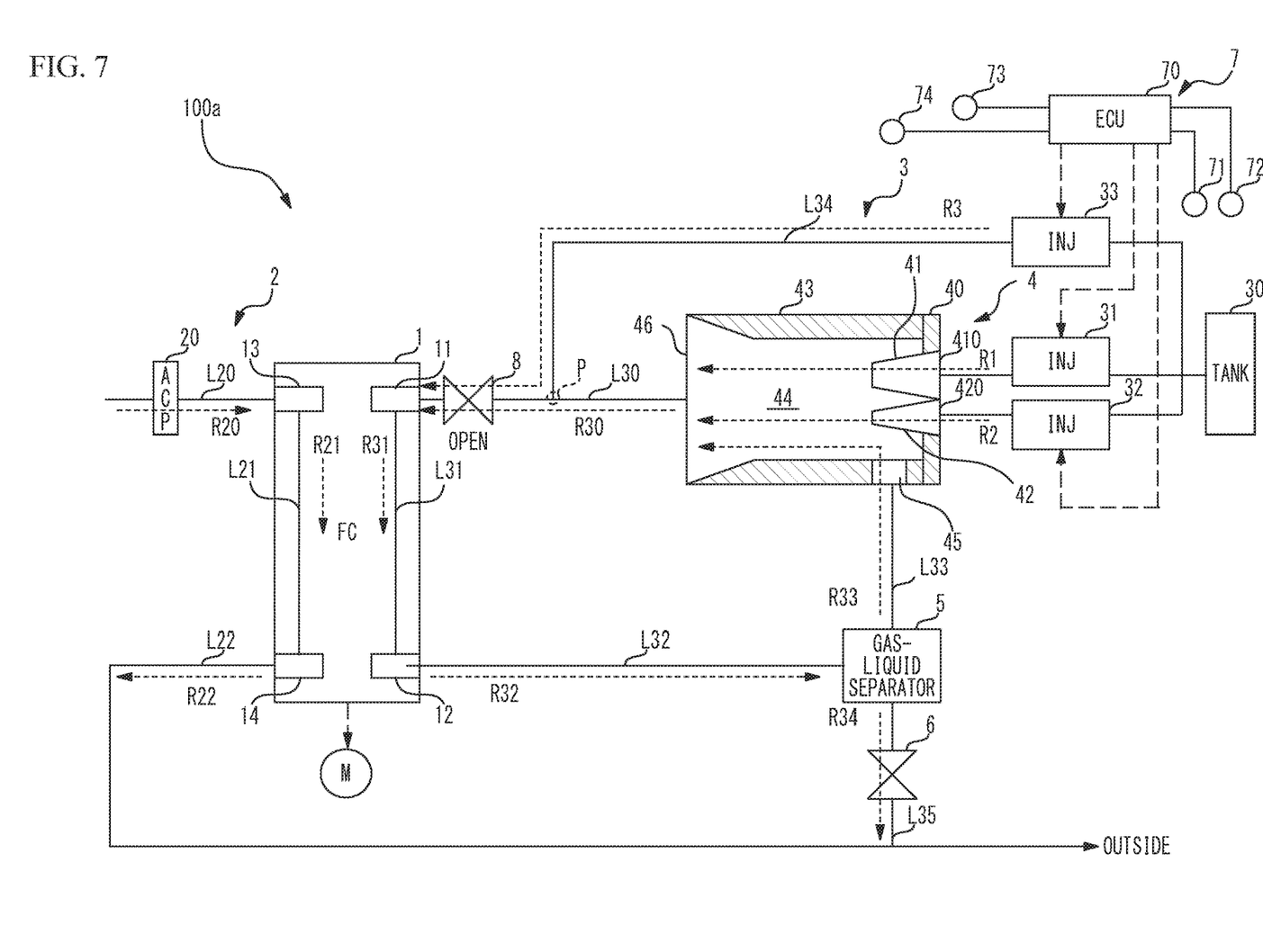
FIG. 7 is a configuration view illustrating an example of another fuel cell system.

FIG. 7 is a configuration view illustrating an example of another fuel cell system 100a. In FIG. 7, the same components as those in FIG. 1 are denoted by the same reference numerals, and duplicated description thereof is omitted.

Compared to the example of the fuel cell system 100, a control valve 8 is incorporated into the fuel cell system 100a. The control valve 8 is provided in the anode supply pipe L30, and controls the flow rate of the anode gas flowing from the bypass pipe L34 to the FC 1 in accordance with the opening degree thereof.

The ECU 70 controls the opening degree of the control valve 8. The ECU 70 opens the control valve 8 at the time of power generation of the FC 1 and at the time of purging the ejector 4, the anode gas flow path L31, and the anode discharge pipe L32. For this reason, the anode gas injected from the main INJs 31 and 32 and the sub INJ 33 flows into the inlet 11 of the FC 1 through the anode supply pipe L30 as illustrated by arrows R30 and R3.

Figure 8:
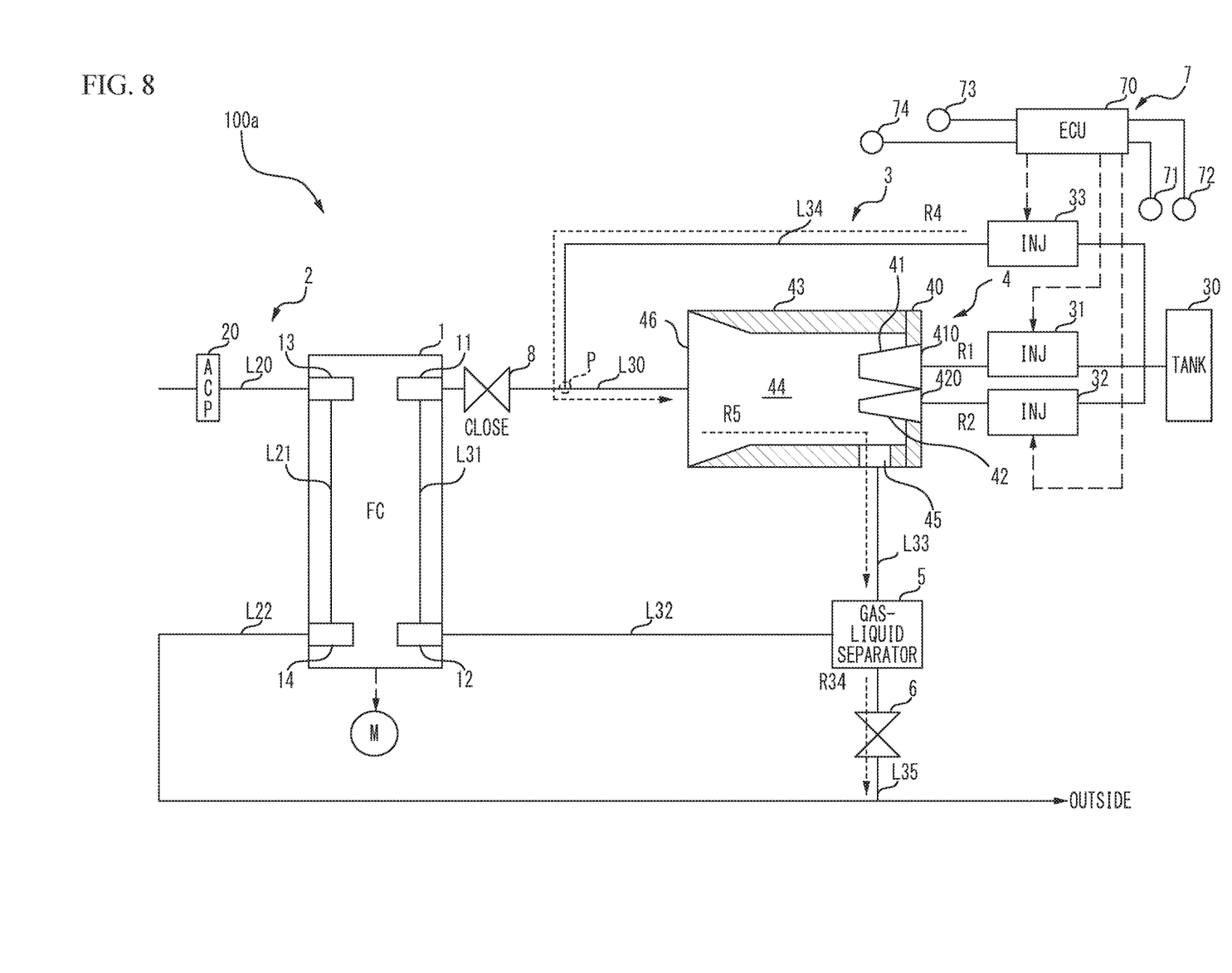
FIG. 8 is a view illustrating another example of the purge process for purging the return pipe.

FIG. 8 is a view illustrating another example of the purge process for purging the return pipe L33. In FIG. 8, the same components as those in FIG. 2 are denoted by the same reference numerals, and duplicated description thereof is omitted.

The ECU 70 closes the control valve 8 when purging the return pipe L33. That is, the ECU 70 sets the opening degree of the control valve 8 to 0%. Therefore, unlike the example illustrated in FIG. 2, all the anode gas injected from the sub INJ 33 flows to the ejector 4. Thus, the flow rate of the anode gas flowing in the return pipe L33 increases as compared with the example illustrated in FIG. 2, and more liquid water is collected to the gas-liquid separator 5 from the return pipe L33.

Further, the ECU 70 does not always need to set the opening degree of the control valve 8 to 0%. The ECU 70 has only to reduce the opening degree of the control valve 8, as compared with the case of purging the ejector 4, the anode gas flow path L31, and the anode discharge pipe L32. This decreases the amount of the anode gas flowing into the inlet 11 of the FC 1 from the sub INJ 33, which increases the flow rate of the anode gas indicated by the arrow R5. Thus, more liquid water is collected to the gas-liquid separator 5 from the return pipe L33.

Figure 9:
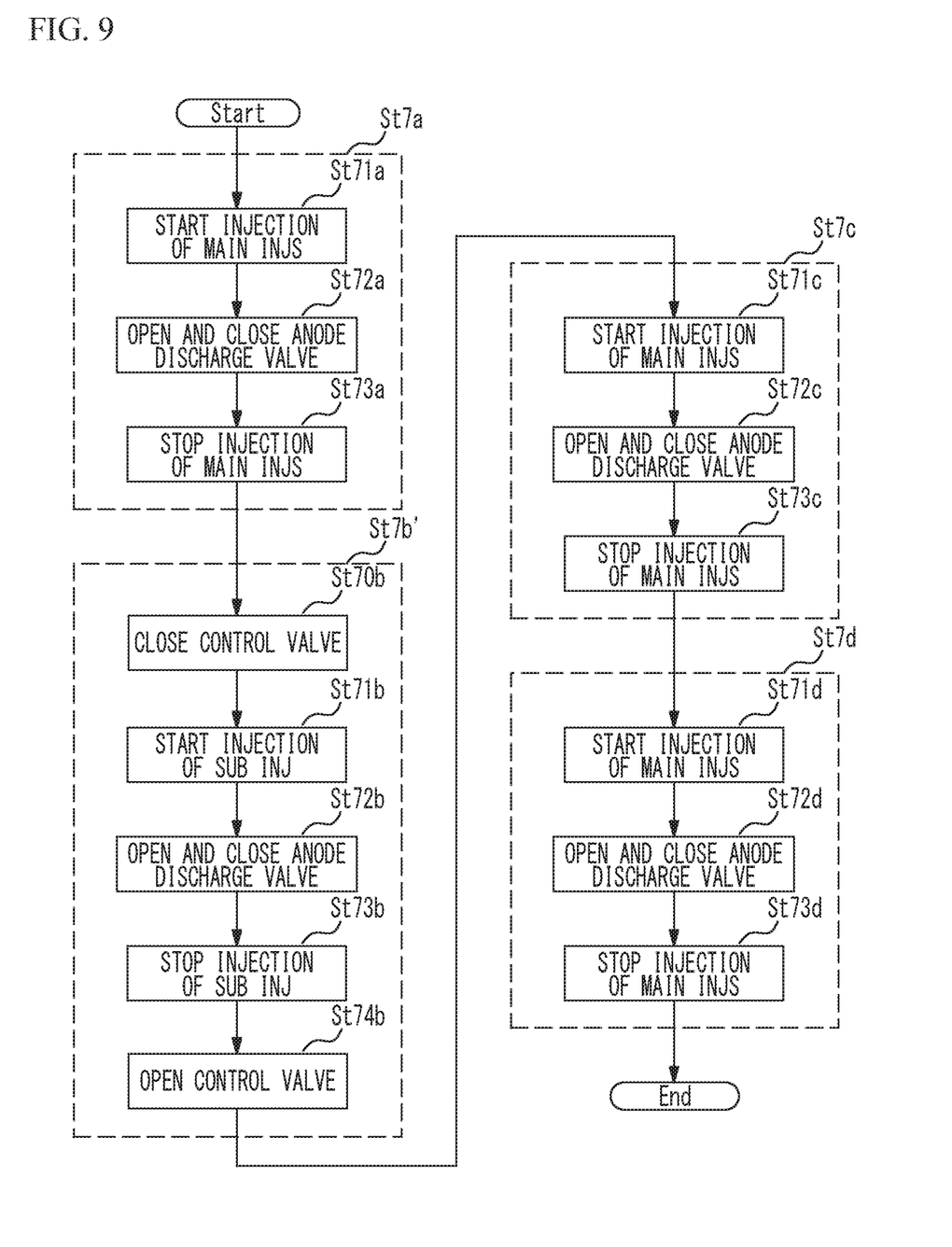
FIG. 9 is a flowchart illustrating the purge processing for another fuel cell system.

FIG. 9 is a flowchart illustrating a purge process in the fuel cell system 100a. In FIG. 9, the same processes as those in FIG. 5 are represented with the same reference numerals, and duplicated description thereof is omitted. It is assumed that the control valve 8 is in an open state in starting this process.

In the purge process for the return pipe L33 (Step St7b'), the ECU 70 closes the control valve 8 (Step St70b), and then performs the injection of the sub INJ 33 (Step St71b). After stopping the injection of the sub INJ 33 (Step St73b), the ECU 70 opens the control valve 8 (Step St74b).

The ECU 70 may decrease the opening degree of the control valve 8 in step St70b. Further, the purge process for the return pipe L33 (Step St7b') may be performed last, like the example of FIG. 6. In this case, the purge process of the gas-liquid separator 5 (Step St7d) is not needed.

As described above, the fuel cell systems 100 and 100a each include the FC 1, the main INJs 31 and 32, the sub INJ 33, the gas-liquid separator 5, the anode discharge valve 6, the ejector 4, the anode supply pipe L30, the bypass pipe L34, the anode discharge pipe L32, the return pipe L33, and the ECU 70. The FC 1 includes the inlet 11 and the outlet 12 for the anode gas. The gas-liquid separator 5 separates the liquid water from the anode gas discharged from the outlet 12 and causes the liquid water to flow out from the opening 52a provided at the vertical lower side of the gas-liquid separator 5. The anode discharge valve 6 discharges the liquid water flowing out of the opening 52a to the outside.

The ejector 4 includes: the inflow port 45 into which the anode gas flows from the gas-liquid separator 5; and the outflow port 46 through which the anode gas injected from the main INJs 31 and 32 flows out together with the anode gas flowing from the inflow port 45. The anode supply pipe L30 is connected between the outflow port 46 and the inlet 11. The bypass pipe L34 introduces the anode gas injected from the sub INJ 33 into the anode supply pipe L30 without flowing through the ejector 4. The anode discharge pipe L32 is connected between the gas-liquid separator 5 and the outlet 12. The return pipe L33 is connected between the gas-liquid separator 5 and the inflow port 45, and extends vertically upward from the gas-liquid separator 5.

The ECU 70 opens and closes the anode discharge valve 6 to perform the injection of the main INJs 31 and 32 to purge the ejector 4, the FC 1, and the anode exhaust pipe L32. The ECU 70 stops the injection of the main INJs 31 and 32, and performs the injection the sub INJ 33 to purge the return pipe L33.

According to the above configuration, the ECU 70 opens the anode discharge valve 6 to perform the injection of the main INJs 31 and 32 to purge the ejector 4, the FC 1, and the anode discharge pipe L32. Thus, the anode gas enters the ejector 4 from the main INJs 31 and 32, flows into the inlet 11 of the FC 1 through the anode supply pipe L30 from the outflow port 46 of the ejector 4. The anode gas is discharged from the outlet 12 of the FC 1, flows into the gas-liquid separator 5 through the anode discharge pipe L32. The gas-liquid separator 5 separates the liquid water from the anode gas and causes the liquid water to flow out from the opening 52a provided at the vertically lower side of the gas-liquid separator 5. The anode gas flows into the inlet port 45 of the ejector 4 through the return pipe L33 from the gas-liquid separator 5, and flows through the anode supply pipe L30 from the outlet port 46 with the anode gas injected by the main INJs 31 and 32. In this manner, the anode gas circulates to the FC 1.

Therefore, the liquid water having been remained in the ejector 4, the FC 1, and the anode discharge pipe L32 gathers in the gas-liquid separator 5.

Further, the ECU 70 stops the injection of the main INJs 31 and 32, opens the anode discharge valve 6, and performs the injection of the sub INJ 33, to purge the return pipe L33. Thus, the anode gas is introduced from the sub INJ 33 into the anode supply pipe L30 without flowing through the ejector 4, and flows backward through the anode supply pipe L30 into the ejector 4 through the outflow port 46. The anode gas flows backward through the return pipe L33 from the outflow port 46 of the ejector 4 into the gas-liquid separator 5. The gas-liquid separator 5 separates the liquid water from the anode gas and causes the liquid water to flow out from the opening 52a provided at the vertically lower side.

Herein, although the return pipe L33 extends vertically upward from the gas-liquid separator 5, the anode gas flows backward through the return pipe L33 by gravity, so the liquid water having been remained in the return pipe L33 tends to flow to the gas-liquid separator 5. Therefore, the liquid water having been remained in the return pipe L33 gathers in the gas-liquid separator 5. Further, the ECU 70 opens the anode discharge valve 6 to discharge the liquid water in the gas-liquid separator 5. Therefore, the fuel cell systems 100 and 100a reduce an amount of the liquid water remaining after purge.

Although some embodiments of the present disclosure have been described in detail, the present disclosure is not limited to the specific embodiments but may be varied or changed within the scope of the present disclosure as claimed.

The invention claimed is:

1. A fuel cell system comprising:
a fuel cell including an inlet and an outlet for purge gas;
a first injection device and a second injection device that inject the purge gas;
a gas-liquid separator that separates liquid water from the purge gas discharged from the outlet and causes the liquid water to flow out from an opening provided at a vertically lower side of the gas-liquid separator;
a discharge valve that discharges the liquid water flowing out from the opening to an outside;
an ejector including:
an inflow port into which the purge gas flows from the gas-liquid separator; and
an outflow port through which the purge gas injected from the first injection device flows out together with the purge gas flowing from the inflow port;
a first connection path connected between the outflow port and the inlet;
an introduction path that introduces the purge gas injected from the second injection device into the first connection path without flowing through the ejector;
a second connection path connected between the gas-liquid separator and the outlet;
a third connection path connected between the gas-liquid separator and the inflow port, and extending vertically upward from the gas-liquid separator; and
a controller configured to purge the ejector, the fuel cell, and the second connection path by performing injection of the first injection device, to purge the third connection path by stopping the injection of the first injection device and by performing injection of the second injection device, and to discharge the liquid water in the gas-liquid separator by opening the discharge valve.

2. The fuel cell system according to claim 1, wherein the controller is configured to purge the third connection path after purging the ejector.

3. The fuel cell system according to claim 1, wherein the controller is configured to purge the third connection path after purging the ejector, the fuel cell, and the second connection path.

4. The fuel cell system according to claim 1, further comprising a temperature detector that detects an outside air temperature,
  wherein the controller is configured to purge the ejector, the fuel cell, the second connection path, and the third connection path, when the outside air temperature is equal to or lower than a freezing point.

5. The fuel cell system according to claim 4, wherein the controller is configured to purge the ejector, the fuel cell, the second connection path, and the third connection path, when the outside air temperature is higher than the freezing point, and when a temperature of the discharge valve is estimated to be equal to or lower than the freezing point.

6. The fuel cell system according to claim 1, further comprising a control valve provided in the first connection path, controlling a flow rate of the purge gas flowing through the first connection path from the introduction path to the fuel cell in according with an opening degree of the control valve,
  wherein the controller is configured to control the opening degree of the control valve to be smaller in purging the third connection path than in purging the ejector, the fuel cell, and the second connection path.

7. A purge method for a fuel cell system, wherein
  the fuel cell system includes:
    a fuel cell including an inlet and an outlet for purge gas;
    a first injection device and a second injection device that inject the purge gas;
    a gas-liquid separator that separates liquid water from the purge gas discharged from the outlet and causes the liquid water to flow out from an opening provided at a vertically lower side of the gas-liquid separator;
    a discharge valve that discharges the liquid water flowing out from the opening to an outside;
    an ejector including:
      an inflow port into which the purge gas flows from the gas-liquid separator; and
      an outflow port through which the purge gas injected from the first injection device flows out together with the purge gas flowing from the inflow port;
    a first connection path connected between the outflow port and the inlet;
    an introduction path that introduces the purge gas injected from the second injection device into the first connection path without flowing through the ejector;
    a second connection path connected between the gas-liquid separator and the outlet; and
    a third connection path connected between the gas-liquid separator and the inflow port, and extending vertically upward from the gas-liquid separator, and
  the purge method comprises:
    purging the ejector, the fuel cell, and the second connection path by performing injection of the first injection device;
    purging the third connection path by stopping the injection of the first injection device and by performing injection of the second injection device; and
    discharging the liquid water in the gas-liquid separator by opening the discharge valve.

8. The purge method for the fuel cell system according to claim 7, wherein the purging the third connection path is performed after the purging the ejector.

9. The purge method for the fuel cell system according to claim 7, wherein the purging the third connection path is performed after the purging the ejector, the fuel cell, and the second connection path.

10. The purge method for the fuel cell system according to claim 7, wherein
  the fuel cell system includes a temperature detector that detects an outside air temperature, and
  the purging the ejector, the fuel cell, the second connection path, and the purging the third connection path are performed, when the outside air temperature is equal to or lower than a freezing point.

11. The purge method for the fuel cell system according to claim 10, wherein the purging the ejector, the fuel cell, the second connection path, and the purging the third connection path are performed, when the outside air temperature is higher than the freezing point, and when a temperature of the discharge valve is estimated to be equal to or lower than the freezing point.

12. The purge method for the fuel cell system according to claim 7,
  wherein the fuel cell system includes a control valve provided in the first connection path, and controlling a flow rate of the purge gas flowing through the first connection path from the introduction path to the fuel cell in according with an opening degree of the control valve, and
  the method includes controlling the opening degree of the control valve to be smaller in the purging the third connection path than in the purging the ejector, the fuel cell, and the second connection path.

* * * * *